United States Patent

[11] 3,582,546

[72] Inventor Earl F. Brown Piscataway, N.J.
[21] Appl. No. 833,129
[22] Filed June 13, 1969
[45] Patented June 1, 1971
[73] Assignee Bell Telephone Laboratories, Incorporated Murray Hill, Berkeley Heights, N.J.

[54] REDUNDANCY REDUCTION SYSTEM FOR USE WITH A SIGNAL HAVING FRAME INTERVALS

7 Claims, 2 Drawing Figs.

[52] U.S. Cl. .......... 178/7.1, 179/15.55
[51] Int. Cl. .......... H04n 7/12
[50] Field of Search .......... 178/6 BWR, 6.8, 7.1; 179/15.55

*Primary Examiner*—Robert L. Griffin
*Assistant Examiner*—Richard K. Eckert, Jr.
*Attorneys*—R. J. Guenther and E. W. Adams, Jr.

ABSTRACT: A redundancy reduction system is described in which plural amplitude samples of a video signal are taken during each frame interval. The amplitude values for each set of four samples are coupled to the input of a circuit which operates in accordance with a fixed function to produce an indicator word for that set. The indicator words thereby generated for an entire frame interval are stored in a frame memory at positions in the memory corresponding to their respective set positions within the frame interval. In succeeding frames a similarly generated indicator word for a set of samples is compared with its corresponding stored indicator word from the frame memory. Only if a difference exists between the two indicator words is the set of new amplitude samples transmitted to a receiving location.

INVENTOR
E. F. BROWN
BY Daniel D. Dubosky
ATTORNEY

PATENTED JUN 1 1971 3,582,546

REDUNDANCY REDUCTION SYSTEM FOR USE WITH A SIGNAL HAVING FRAME INTERVALS

BACKGROUND OF THE INVENTION

This invention relates to redundancy reduction systems, and more particularly to redundancy reduction systems in which samples from a plurality of input sensors are taken during periodic intervals.

In prior art redundancy reduction systems applicable to telemetry signals, the input telemetry sensors are periodically sampled by a multiplexing apparatus, and the amplitude for each sensor during a frame interval is stored in a frame memory. During succeeding frame intervals the amplitude for any one of the input sensors is transmitted to a receiving location only if the new amplitude represents a significant change from its corresponding previously stored amplitude. This technique of conditionally replenishing a receiving frame memory with updated amplitude samples was applied to a video signal in the copending application by F. W. Mounts entitled, "Redundancy Reduction System for Video Signals," Ser. No. 749,770 filed Aug. 2, 1968. In the Mounts application a frame memory having a capacity to store an entire frame of video samples is utilized to store each sample from a video signal at a position in the memory corresponding to the location of the sample in the frame interval. Each new sample in a succeeding frame is transmitted to the receiving location only if the amplitude of the new sample differs significantly from its corresponding sample stored in the frame memory. In the system described in the application by Mounts, a considerable reduction in the number of bits required to be transmitted is achieved through utilization of the inventive concepts disclosed in this application.

It has been experimentally discovered that when sample changes occur in the video frame interval they tend to occur in clusters. In other words, when one sample is discovered to have changed and therefore require transmission to a receiving location, there is a very high probability that the samples in neighboring or adjacent address locations will also require transmission to the receiving location. Systems which take advantage of this phenomenon are described in two other copending applications entitled "Conditional Replenishment Video System with Run Length Coding of Position," Ser. No. 820,537 filed Apr. 30, 1969 and "Conditional Replenishment Video System with Sample Grouping" Ser. No. 820,552 filed Apr. 30, 1969 both by F. W. Mounts. In each of these systems a reduction in the number of bits required to transmit positional information is achieved by transmitting the amplitude samples in groups with code and flag words being utilized to identify the size of each group. Nevertheless each of these systems still requires that the frame memory store the amplitude information for all of the video samples in an entire frame interval.

SUMMARY OF THE INVENTION

A primary object of the present invention is to reduce the required capacity of a frame memory in a conditional replenishment video system. This object and others are achieved in accordance with the presentation wherein the amplitude samples from an input signal are processed in sets with a predetermined number of input samples in each set. The amplitude values for the samples in each set are utilized by a circuit which operates in accordance with a fixed function to produce an indicator word which can be represented by a number of bits less than the number of bits required to represent an individual sample amplitude. The indicator words for the sets in an entire frame interval are stored in a frame memory. In succeeding frame intervals the amplitude values for the samples in a set are operated upon by the same indicator word generating circuitry to produce a new indicator word with a value representative of the new amplitude values. This new indicator word is compared with the indicator word previously stored in the frame memory in a position corresponding to this set of picture elements. If the two indicator words for this set of picture elements differ significantly, the entire set of new amplitude values is transmitted to the receiving location. Since each indicator word has fewer bits than even a single amplitude sample, a considerable saving in required frame memory capacity is achieved.

In the present embodiment, the absolute magnitude of the difference obtained by subtracting the amplitude of the first sample in a set from the amplitude of the second sample is subtracted from the amplitude of the second sample is subtracted from the amplitude of the third sample in a set. The difference thereby obtained is then subtracted from the amplitude of the next sample in the set. This process of successive subtractions is continued until a quantity is subtracted from the amplitude of the last sample in the set. At this point only the least significant bits of the final result are utilized as an indicator word for comparison with the words stored in the frame memory. Since any changes which do occur in the amplitude values of the samples in a set are unlikely to produce changes only in the most significant bits, only the least significant bits are required to be used as the indicator word.

BRIEF DESCRIPTION OF THE DRAWING

The invention will be more readily understood after reading the following detailed description in conjunction with the drawing in which.

DETAILED DESCRIPTION

Figure 1:
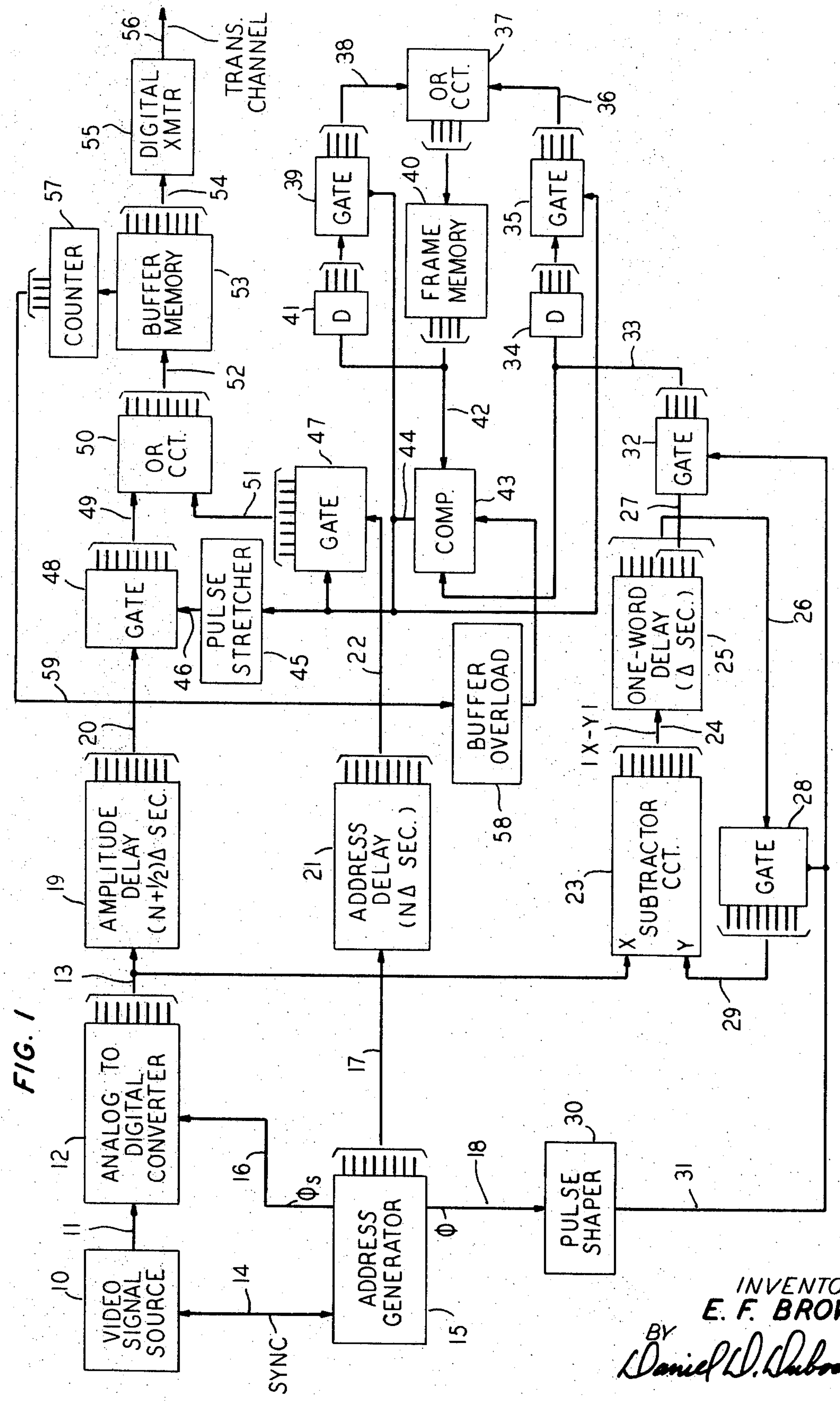
FIG. 1 is a schematic block diagram of one embodiment of a redundancy reduction transmitting apparatus constructed in accordance with the present invention.

In FIG. 1 a video signal source 10 containing a camera tube such as a vidicon plus associated circuitry produces on line 11 a video signal of the standard type having time intervals and subintervals called frames and lines, respectively. A synchronization link by way of line 14 between video signal source 10 and an address generator 15 insures that the digital word provided by address generator 15 on bus 17 will always indicate the location of the amplitude on line 11 within the video frame. The synchronization by way of line 14 may originate in either the video signal source 10 or address generator 15. In the present embodiment, the value of the digital word on bus 17 relates to the time location within the entire video frame. It is to be understood, however, that this address location provided by the value of the digital word on bus 17 may relate to the position within a video line only providing that line synchronization is maintained between the transmitting and receiving locations. This type of synchronization is fully described in the above-identified copending application by F. W. Mounts, Ser. No. 749,770.

Address generator 15 also provides voltage impulses on line 18 at a rate equal to the rate at which the digital address words are provided on bus 17. In addition, address generator 15 provides a pulse train of voltage impulses on line 16 in which a predetermined number of voltage impulses is provided urging each of the intervals between the voltage impulses provided on line 18. In FIG. 1 the pulse train on line 18 is designated as $\Phi$ and is shown as waveform A in FIG. 2 with voltage impulses occurring in the waveform separated by equal intervals of $N \cdot \Delta$ seconds. The pulse train on line 16 is designated in FIG. 1 as $\Phi_s$ and is shown as waveform B in FIG. 2 for a case where $N$ is equal to 4 with voltage impulses occurring in the waveform at equal intervals of $\Delta$ seconds. For this particular case, $N$=4, four impulses appear on line 16 for every one voltage impulse on line 18.

The voltage impulses on line 16 are coupled to the analog-to-digital converter 12. In response to each voltage impulse, converter 12 samples the video signal presented on line 11 and produces at its output on bus 13 a digital word whose value is equal to the voltage amplitude of the video signal sample. Bus 13, like bus 17, and all other lines in the drawing referred to hereinafter as buses, are actually constructed of several transmission paths in parallel, each one of which carries a single bit of the digital word said to be carried by its respective bus. In the present embodiment, the amplitude and address words on buses 13 and 17 respectively each contain eight bits. Each digital word on bus 13 representing the amplitude of a video sample is coupled to one input of a subtractor circuit 23. The other input of subtractor circuit 23 is coupled by way of bus 29 to the output of a transmission gate 28. Subtractor circuit 23 develops the absolute magnitude of the difference between the two digital words presented at its two inputs.

Since the voltage impulses on line 16 dictate the rate at which sampling takes place, Δ is also equal to the interval between adjacent samples on bus 13. These digital words on bus 13 which represent video signal amplitudes are caused to appear on bus 13 for only one half of the Δ second interval. A representation of this fact is shown as waveform C in FIG. 2 wherein each positive excursion of the waveform represents a period of time during which a digital word is present on bus 13 at the output of the analog-to-digital converter 12. For the purpose of describing operation of the present embodiment the digital words provided during these intervals have been arbitrarily designated in FIG. 2 as $X_i$, where $i$ is equal to the number of the interval from the arbitrary beginning of $t=0$ in FIG. 2. Similarly, the presence of an address digital word at the output of address generator 15 on bus 17 is represented by the waveform D in FIG. 2. In this waveform, each positive excursion of the wave designates an interval during which an address word is present on bus 17. The address words are designated in FIG. 2 as $A_j$, where $j$ is equal to the number of the address word from the arbitrary beginning of $t=0$ in FIG. 2. From waveforms C and D in FIG. 2 it can be seen that an address digital word appears on bus 17 only during the interval when a first sample of a set of samples appears on bus 13 where a set of samples is defined as those samples occurring during and following an address word up to but not including the sample occurring during the next address word. During the other samples of the set no address word is present on bus 17.

Figure 2:
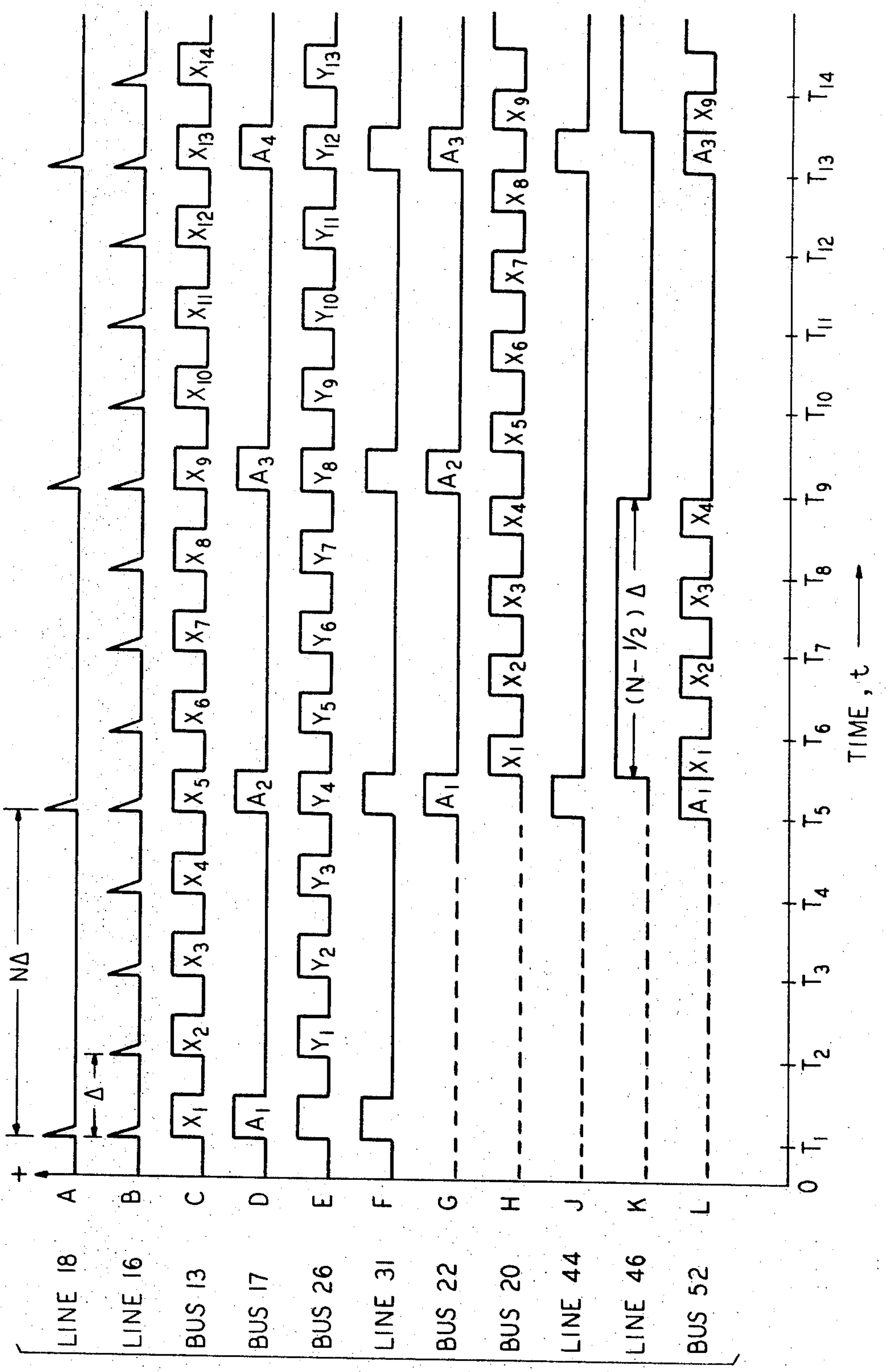
FIG. 2 is a display of waveforms useful in connection with the description of the apparatus shown in FIG. 1.

The voltage impulses on line 18 are coupled to the input of a pulse shaper 30. Pulse shaper 30 in response to the voltage impulses on line 18 produces energizing signals each having a duration of Δ/2 seconds and occurring at a rate equal to that at which the address words are produced on bus 17. The voltage waveform for the energizing pulses produced by pulse shaper 30 on line 31 is shown in waveform F of FIG. 2. The energizing pulses on line 31 are coupled to the inhibit control input of transmission gate 28. Since the energizing pulse on line 31 is present during the interval when the first digital word in a set of samples, for example, $X_1$ in waveform C of FIG. 2, is present on bus 13 and since transmission gate 28 is inhibited during this interval, only the X-input of subtractor circuit 23 is presented with a digital word during the interval corresponding to the first sample in a set. During this interval, subtractor circuit 23 presents at its output bus 24 a digital word identical to the amplitude word present on bus 13. In essence, the value being subtracted from the digital word on bus 13 is equal to zero.

The digital word on bus 24 is coupled to the input of a delay circuit 25 which provides a delay equal in duration to Δ seconds, the time interval between adjacent amplitude samples. The digital word on bus 26 at the output of delay circuit 25 is coupled to the input of transmission gate 28. During the interval when the second sample in a set of samples, for example $X_{20}$in waveform C of FIG. 2, appears at the output bus 13 of analog-to-digital converter 12, transmission gate 28 is not inhibited. Accordingly, the digital word at the output of delay circuit 25 which resulted from the first sample in the set of samples is coupled during this interval through transmission gate 28 to the Y-input of subtractor circuit 23. As a result, subtractor circuit 23 during the second sampling interval provides a digital word on bus 24 whose magnitude is equal to the absolute magnitude of the difference between the magnitude of the sample during the second sampling interval less the magnitude of the sample from the first sampling interval. This absolute magnitude of the difference developed on bus 24 is then coupled through delay circuit 25 and coupled by way of transmission gate 28 to the Y-input of subtractor circuit 23 during the third sampling interval in a set of samples.

In mathematical terms, the digital words at the output of one-word delay circuit 25 can be expressed by the following equations:

$$Y_1=|X_1|$$
$$Y_2=|X_2-X_1|$$
$$Y_3=|X_3-|X_2-X_1||$$
$$Y_4=|X_4-|X_3-|X_2-X_1|||$$
$$Y_5=|X_5|$$
$$Y_6=|X_6-X_5|$$
$$Y_7=|X_7-|X_6-X_5||$$
$$Y_8=|X_8-|X_7-|X_6-X_5|||$$

etc, where the subscript designations relate to those intervals designated in waveform C and E in FIG. 2, and each positive output in waveform E represents the presence of a digital word at the output of the one-word delay circuit 25.

As can be seen by these equations, the process of taking successive subtractions of the absolute magnitude of a difference from the amplitude of a present sample on bus 13 is continued until the next energizing pulse appears on line 31 at the output of pulse shaper 30. At this time, transmission gate 28 blocks the passage of the last absolute magnitude of the difference from being coupled from the output of delay circuit 25 to the Y-input of subtractor circuit 23. The energizing pulse on line 31 does, however, enable a transmission gate 32 whose input is connected by way of bus 27 to the four least significant bits of the output of delay circuit 25. These four least significant bits are coupled as an indicator word through transmission gate 32 when the pulse is present on line 31 to the input of a delay circuit 34 and also to one input of a comparison circuit 43.

In a manner which will be more readily understood after the operation of the remainder of the circuit has been described, the other input of comparison circuit 43 is presented with a four-bit digital indicator word whose magnitude was developed during a previous video frame for the same set of picture elements or spatial points within the video frame which produced the present four-bit digital indicator word at the first-mentioned input of comparison circuit 43. If the indicator word on bus 33 resulting from the picture element amplitudes in the present video frame differs in magnitude from the indicator word on bus 42 at the other input of comparison circuit 43 by more than a predetermined threshold difference, comparison circuit 43 produces an energizing pulse on line 44 as an indication that a change has occurred in the picture elements or spatial points corresponding to samples which produced these four-bit digital words. This energizing pulse on line 44 is present for an interval of Δ/2 seconds. If, however, the two indicator words presented at the input of comparison circuit 43 do not differ by more than the predetermined threshold level no energizing pulse is produced on line 44.

If the new indicator word is significantly different from the indicator word derived from the same set of picture elements in a previous video frame, the resulting energizing pulse on line 44 enables the control input of a transmission gate 35 and energizes the inhibit control input of a transmission gate 39. With transmission gate 35 energized the four-bit digital word from the output of delay circuit 34 is coupled through gate 35 by way of bus 36 to one input of an OR circuit 37. The other input of OR circuit 37 is not, under these conditions, presented with any input signal since it is coupled by way of bus 38 to the output of transmission gate 39 which is rendered inactive by the presence of an energizing pulse on line 44. As a result, the new four-bit indicator word from delay circuit 34 is coupled through OR circuit 37 to the input of a frame memory 40. OR circuit 37 is actually constructed of four OR gates, each having two inputs, one of which is connected to a path in bus 36 and the other of which is connected to the corresponding bit path in bus 38.

Frame memory 40 is constructed of four delay lines one for each of the four bit paths provided at the output of OR circuit 37. Each of the delay lines has a delay equal in duration to one video frame time less the delay time of delay circuit 34. Delay circuit 34 has a short delay time long enough only to permit comparison circuit 43 to respond to a significant difference and produce the resulting energizing signal on line 44. Accordingly, the new four-bit indicator word which is coupled into frame memory 40 by way of gate 35 appears on bus 42 at the output of frame memory 40, a time interval, which is exactly equal to one frame time of the input video signal, after its appearance on bus 33. As a result, this above-identified new indicator word when on bus 42 will be available for comparison with the next indicator word which is developed from the same set of picture elements or spatial points in the picture.

If the new indicator word is not significantly different from the indicator word stored in a previous frame, no energizing pulse is produced on line 44 and therefore transmission gate 35 is not energized, whereas transmission gate 39 is not inhibited by the presence of an energizing pulse. As a result, the indicator word on bus 42 from a previous video frame is coupled through delay circuit 41 and transmission gate 39 by way of bus 38 to the other input of OR circuit 37. Delay circuit 41 has a delay identical to that provided by delay circuit 34. In this way previously stored indicator words are recirculated in frame memory 40 and only updated by a new indicator word when the comparison performed by comparison circuit 43 has indicated that the new indicator word differs significantly from the previously sorted indicator word corresponding to the same set of picture elements.

An address delay circuit 21 delays the address digital word on bus 17 by an interval of $N \cdot \Delta$ seconds, where $\Delta$ is equal to the interval between adjacent amplitude samples and $N$ is equal to the number of samples in a set. In the present embodiment $N$=4. Address delay circuit 21 is actually constructed of eight delay lines one for each of the bit paths provided on bus 17. Each address word presented on bus 17 is therefore delayed by address delay circuit 21 for an interval of 4$\Delta$ seconds, as indicated by waveform G in FIG. 2. The amplitude digital words on bus 13 are similar similarly by an amplitude delay circuit 19, but are delayed for an interval of $(N+\frac{1}{2})\Delta$ *seconds, as indicated for N=4* by waveform H in FIG. 2. As indicated in both of the waveforms G and H in FIG. 2 the address word, even though delayed by circuit 21, continues to be presented on bus 22 during an interval in waveform D which is allocated to address words, whereas the amplitude digital words on bus 20 having been delayed by circuit 19 all appear in the interval between the address word corresponding to the set to which the amplitude words belong and the address word corresponding to the next set.

Waveform J of FIG. 2 is the voltage waveform provided at the output of comparison circuit 43 on line 44 for the case where the indicator words derived from the differences $Y_4$ and $Y_{12}$, occurring at $t=T_5$ and $t=T_{13}$, respectively, have been determined to represent a significant change, and further where the indicator word derived from the difference $Y_{80}$ at $t=T_9$ has been determined not to represent a significant change. Accordingly, comparison circuit 43 produces energizing pulses of $\Delta/2$ seconds starting at $t=T_5$ and $t=T_{13}$ whereas no energizing pulse is produced at $t=T_9$.

An energizing pulse produced by comparison circuit 43 is coupled via line 44 to the control input of a transmission gate 47. This gate in response to the energizing pulse at its control input couples the address word on bus 22 to one input of an OR circuit 50 by way of bus 51. As a result the address word designated as $A_1$ in FIG. 2 is coupled through gate 47 and through OR circuit 50 into the buffer memory 53 by way of bus 52. OR circuit 50 like the above-mentioned OR circuit 37 is constructed of a plurality of OR circuits one for each of the bits in the word said to be coupled by the OR circuit.

The energizing pulse out of comparison circuit 43 is also connected to the input of a pulse stretcher circuit 45. In response to the negative-going voltage transient in the energizing pulse, pulse stretcher circuit 45 produces an energizing pulse at its output on line 46 having a time duration of $(N-\frac{1}{2})$ $\Delta$ *seconds. This longer energizing pulse on line 46 is coupled to the control input of a transmission gate 48. In response to this pulse, gate 48 couples the delayed amplitude digital words on bus 20 through gate 48 to a second input of OR circuit 50 by way of bus 49. In summary, a single energizing pulse on line 44 at the output of comparison circuit 45 causes the address word and digital amplitude words corresponding to this address word to be coupled through OR circuit 50 into buffer memory 53, as indicated in waveform L of FIG. 2 in the time interval between* $t=T_5$ and $t=T_9$. When no energizing pulse is developed by the comparison circuit 43 as is the case at $t=T_9$ in FIG. 2, neither the address word nor the amplitude digital words are coupled into the buffer memory 53.

A count of the number of words stored in buffer memory 53 is maintained by counter circuit 57. The output of counter 57 is connected to a buffer overload circuit 58. When the number of digital words in storage in buffer memory 53 is within a predetermined number of the maximum capacity of the buffer memory, buffer overload circuit 58 provides an energizing signal on line 59 to a control input of comparison circuit 43. In response to an energizing signal on line 59 comparison circuit 43 prohibits an energizing pulse from appearing on line 44 even though the two indicator words presented at its inputs differ by more than the predetermined threshold level. Consequently, any indicator word presented on bus 33 during an interval when buffer memory 53 is in danger of being overloaded will not be utilized to update frame memory 40 and further will not be coupled through to buffer memory 53.

The output of buffer memory 53 is coupled by way of bus 54 to the input of a digital transmitter 55. Buffer memory 53 is read out on a first-in, first-out basis, that is, the words are read out in the same sequence as they were written into the memory. The digital words provided in parallel form on bus 54 at the output of buffer memory 53 are converted in digital transmitter 55 to a serial bit stream on transmission channel 56. Techniques by which digital transmitter 55 performs this conversion are well known to those skilled in the pulse code modulation art.

Transmission channel 56 is connected at the far end to a receiving apparatus similar to that described in the above-identified application by F. W. Mounts, Ser. No. 749,770. The receiving apparatus stores the incoming digital words in a receiving buffer memory. This memory is read out by comparing the stored address word with the address position under consideration in a receiving frame memory. When an address word match is achieved, the digital words representing the amplitude samples are coupled from the receiving buffer memory into the receiving frame memory. In this way amplitude values in a receiving frame memory are updated by the transmitted amplitude samples.

Numerous modifications may be made by those skilled in the art without departing from the spirit and scope of the present invention.

I claim:

1. Redundancy reduction transmitting apparatus for use with a signal having periodic frame intervals, said apparatus comprising means for generating address words each one of which indicates a time position within said frame interval, means for sampling said signal a plurality of times during each frame interval, means for generating indicator words each one of which has an amplitude which is a function of a set of a predetermined number of signal samples, means for storing the indicator words generated for an entire frame interval, means for comparing a newly generated indicator word with a stored indicator word corresponding to a previous set of samples having the same time position in a frame interval, and means for transmitting an address word and the samples in a set if those samples result in an indicator word having a value which is different from the value of its corresponding stored indicator word.

2. Transmitting apparatus as defined in claim 1 wherein said means for generating an indicator word includes means for successively subtracting the amplitude values of the samples in a set and further includes means for selecting only the least significant bits derived from the result of said successive subtractions.

3. Transmitting apparatus as defined in claim 2 wherein said means for performing said successive subtractions includes a subtractor circuit having a first and a second input with said first input connected to receive the amplitude value of each sample in the set of samples, a delay circuit means having a delay equal to the interval between adjacent samples with its input connected to the output of said subtractor circuit, and gating means for connecting the output of the delay circuit means to said second input of said subtractor circuit.

4. Redundancy reduction transmitting apparatus for use with a signal having periodic frame intervals, said apparatus comprising means for generating a plurality of address words during each frame interval, each one of said address words having a value which indicates the time position in said frame interval, means for sampling said signal a plural number of times between address words, the plurality of samples following each address word being called a set of samples, means for comparing the amplitude values of the samples in a set with the amplitude values of a previous set of samples having the same time position in a frame interval, means responsive to an indicated difference in said comparison for coupling said each address word and its corresponding amplitude samples to a transmission channel.

5. Transmitting apparatus as defined in claim 4 wherein said means for comparing includes a means for generating an indicator word whose value is dependent on the amplitude values of the samples in a set.

6. Transmitting apparatus as defined in claim 5 wherein said means for generating an indicator word includes a subtractor circuit having two inputs and an output, means for connecting the amplitude samples to one of said two inputs of said subtractor circuit, means for delaying the output of said subtractor circuit for an interval equal in duration to the time between adjacent samples, and means for gating the delayed output of said subtractor circuit to the second of said two inputs of said subtractor circuit, and means for selecting the least significant digits of said delayed output as an indicator word.

7. Transmitting apparatus as defined in claim 6 wherein said means for coupling includes an address delay means having a delay time equal to the duration of a set of samples, and an amplitude delay means for delaying said amplitude samples a duration of time greater than that of the address delay means by one-half of the interval between adjacent samples.